United States Patent [19]

Sauder et al.

[11] E Patent Number: Re. 33,463

[45] Reissued Date of Patent: Nov. 27, 1990

[54] HIGH TEMPERATURE INSULATION MODULE

[75] Inventors: Robert A. Sauder; Gary R. Kendrick; John R. Mase, all of Emporia, Kans.

[73] Assignee: Thermal Ceramics, Inc., Augusta, Ga.

[21] Appl. No.: 257,995

[22] Filed: Apr. 27, 1981

Related U.S. Patent Documents

Reissue of:

[64] Patent No.: 3,819,468
Issued: Jun. 25, 1974
Appl. No.: 157,433
Filed: Jun. 28, 1971

U.S. Applications:

[63] Continuation of Ser. No. 949,384, Oct. 6, 1978, abandoned.

[51] Int. Cl.[5] ..... C04B 43/02

[52] U.S. Cl. ..... 428/99; 52/270; 52/699; 156/71; 156/72; 336/186; 428/120; 428/223; 428/920

[58] Field of Search ..... 428/99, 120, 223, 920; 52/270, 699; 156/71, 92; 336/186

[56] References Cited

U.S. PATENT DOCUMENTS

| | | | |
|---|---|---|---|
| 2,036,467 | 1/1936 | Ellis . | |
| 3,012,923 | 12/1961 | Slayter | 156/62.2 |
| 3,118,807 | 1/1964 | Holcomb | 161/196 |
| 3,135,297 | 6/1964 | Nordberg | 136/144 |
| 3,584,846 | 6/1971 | McCoy | 34/231 |

FOREIGN PATENT DOCUMENTS

| | | |
|---|---|---|
| 90219 | 12/1956 | Denmark . |
| 72983 | 10/1945 | Norway . |

*Primary Examiner*—Marion C. McCamish
*Attorney, Agent, or Firm*—Arnold, White & Durkee

[57] ABSTRACT

A ceramic fiber mat attached to the interior wall or surface of a high temperature chamber or furnace or adapted to overlie an intermediate insulating member positioned between the mat and a furnace wall, the fibers in the mat lying in planes generally perpendicular to the wall, the mat constituting an improved insulation for the wall where the interior of the chamber or furnace will be operating at temperatures in excess of 1600° F.

27 Claims, 2 Drawing Sheets

HIGH TEMPERATURE INSULATION MODULE

Matter enclosed in heavy brackets [ ] appears in the original patent but forms no part of this reissue specification; matter printed in italics indicates the additions made by reissue.

*This is a continuation of application, Ser. No. 05/949,384, filed Oct. 6, 1978, now abandoned, which is a reissue of application Ser. No. 05/157,433, filed June 28, 1971, U.S. Pat. No. 3,819,468.*

CROSS-REFERENCE TO RELATED APPLICATIONS

This application briefly describes, but does not claim, a method and apparatus for welding which is more fully described and claimed in U.S. Pat. No. 3,706,870 issued Dec. 19, 1972, in the names of the inventors Robert A. Sauder and Gary R. Kendrick and entitled "Method and Apparatus for Stud Welding".

FIELD OF THE INVENTION

The present invention relates to a method and apparatus for insulating the interior of a high temperature furnace and more particularly to a ceramic fiber mat constituting the hot face of the insulation and wherein substantially all of the fibers in the fiber mat lie in planes which are generally perpendicular to the various walls of the furnace.

THE PRIOR ART

The problems involved in insulating the interior of a high temperature furnace or, stated differently, the walls and ceiling of such a furnace are well known. Historically, the interiors of high temperature furnaces have been lined with various types of bricks capable of withstanding these high temperatures. When the brick lining wears out, however, it is an arduous and time-consuming task to replace the old brick with a new brick lining. On the other hand, efforts have been made to insulate the interior of a furnace where the interior or hot face of the insulation includes or consists of ceramic fiber material. Ceramic fiber material, as referred to herein, is generally available in the form of a ceramic fiber blanket which is customarily manufactured in a manner similar to the conventional papermaking process. As such, the fibers which constitute the blanket, (as is also the case in connection with paper) are oriented in planes which are generally parallel to the longitudinal direction of formation of the blanket or sheet. When, as propossed in the past, lengths of ceramic fiber blanket are placed against a furnace wall or overlying an intermediate insulating member which, in turn, would be attached to the furnace wall, the fibers will then be lying in planes generally parallel to the furnace wall. Also, it is believed that a majority of these fibers will be lying in a direction which would tend to be colinear with the direction of formation of the blanket itself, although a considerable number of fibers are still in a more or less random disposition in these planes. Nevertheless, where the fibers are disposed in planes which are parallel to the furnace wall, there is a tendency for the fiber blanket material to produce cracks which result from heat shrinkage.

With certain types of insulation it is recognized that high temperature problems sometimes involve melting, oxidation and other types of deterioration of the insulating medium. As far as ceramic fiber insulation is concerned, the high temperature problems are generally cracking, delamination (peeling off of the surface layers), and devitrification, all of which are believed to be interrelated. At the lower temperatures of the recommended range of the present invention, namely, 1600° to 2800° F., devitrification will take place relatively slowly, whereas at the higher end of the range, devitrification will take place quite rapidly, followed, in short order, by cracking and/or delamination.

In retrospect, the prior art broadly discloses the feature of re-orienting fiber insulation, but only in connection with low temperature insulation. For example, Di Maio et al. U.S. Pat. No. 2,949,593 and Slayter U.S. Pat. No. 3,012,923 both show the cutting of strips of fibrous material from a sheet or mat of the same, arranging the strips in a side-by-side relation to provide an end fiber exposure, compressing the strips and, while still compressed, applying an adhesive backing sheet of paper or cloth to one side edge only of the resulting compressed block; thereafter when the forces of compression are removed the resulting block will tend to curl around the adhesive sheet so as to form a suitable insulating body for pipe or the like. However, the resulting insulation is necessarily low temperature insulation because the pipe is in direct contact with the heating or cooling medium which it carries; the insulation is used on the exterior surface of the body or pipe to be insulated; the sole purpose in arranging the strips in an end or edgewise exposure of the fibers is to permit compression of the strips so that, after one side edge is secured in place by means of the backing strip, advantage can be taken of the relatively greater expansibility along the unsecured edge.

SUMMARY OF THE INVENTION

The present invention involves the use of a ceramic fiber mat which can be applied either directly to the interior of a high-temperature furnace or to an intermediate insulating member which, in turn, is attached to one of the furnace walls. The term "wall" should be construed as covering any side wall or ceiling, removable or fixed, the area surrounding any access opening and any other surface on the interior of the high-temperature chamber where insulation is required or desired. The term "furnace" should be construed as covering any high-temperature chamber, oven, heater, kiln or duct with the understanding that the insulation is always internal and always "high-temperature", namely capable of operating at temperatures in excess of 1600° F.

The ceramic fiber mat is preferably made up of strips which are cut transversely from a length of ceramic fiber blanketing which is commercially available. The strips are cut from the fiber blanket in widths that represent the linear distance from the cold face to the hot face of the insulating fiber mat. The strips which are cut from the blanket are placed on edge and laid lengthwise adjacent each other with a sufficient number of strips being employed to provide a mat of the desired width. Naturally, the thickness of the fiber blanket from which the strips are cut will determine the number of strips required to construct the mat. The strips can be fastened together by wires, or by ceramic cement or mortar which is preferably employed in the region of the cold face of the mat. The mat can be applied to the furnace wall or to an intermediate member by means of a stud welding method or by ceramic cement, mortar, or the like.

As disclosed herein, the present invention has particular application for the internal insulation of furnace walls of high temperature furnaces. For the purposes of the present invention, "high temperature" will mean temperatures in excess of 1600° F. and, preferably, in the range of 1600° F. to 2800° F. The ceramic fiber strips referred to herein are cut from a ceramic fiber blanket which is commercially available from several different manufacturers; these blankets are manufactured under the trademarks or tradenames "Kaowool" (Babcock & Wilcox), "Fiber-Frax" (Carborundum Co.), "Lo-Con" (Carborundum Co,), and "Cero-Felt" (Johns Manville Corp.). Most of these ceramic fiber blankets have an indicated maximum operating temperature of about 2300° F. The end or edge fiber exposure provided by the present invention not only provides an improved insulation up to the maximum indicated operating temperatures suggested by the manufacturers, but because devitrification and its deleterious effects are largely eliminated, also permits operation up to about 2800° F.

By arranging the fibers in an end or edgewise exposure; that is, where the fibers are oriented in planes generally perpendicular to the wall of the furnace, devitrification is not necessarily avoided but its undesirable side effects are minimized or eliminated because devitrification takes place at the ends of the fibers rather than along the lengths thereof; thus cracking and delamination are essentially avoided by the present invention even up to a temperature of 2800° F. which is above the recommended maximum temperature specifications imposed upon the fiber blankets by the manufacturers.

The present invention also provides an insulation which will maintain the outside (cold face) of the furnace within an acceptable range. It is recognized that the minimum external temperature will be dependent upon a number of different factors including, but not limited to, the type, thickness and strength of the outside furnace wall; ambient temperature conditions outside the furnace wall. The use of the present invention, however, will provide an outside temperature varying between 200° and 350° F. which is considered to be an acceptable range, the temperature being measured in still air at 83° F.

Another advantage which accrues from the use of the fiber blanket (or strips thereof) in the end or edge exposure of the fibers is that the resulting mat has a certain resiliency in a direction parallel to the insulated face. Thus, where metallic fasteners are employed to attach the mat or composite block to the interior wall of the furnace or oven by "burying" or imbedding the fastener in the insulating member, this natural resiliency of the material will tend to keep the ends of the fastening elements completely covered at all times; this is true even if a tool is inserted in or through the fiber material to engage the metallic fastener for turning or welding purposes; after the tool has been withdrawn the natural resiliency of the fibrous material, as presently oriented, will cause the material to spring back and completely cover the outer end of the metallic fastening member.

DESCRIPTION OF THE PREFERRED EMBODIMENTS

Figure 1:
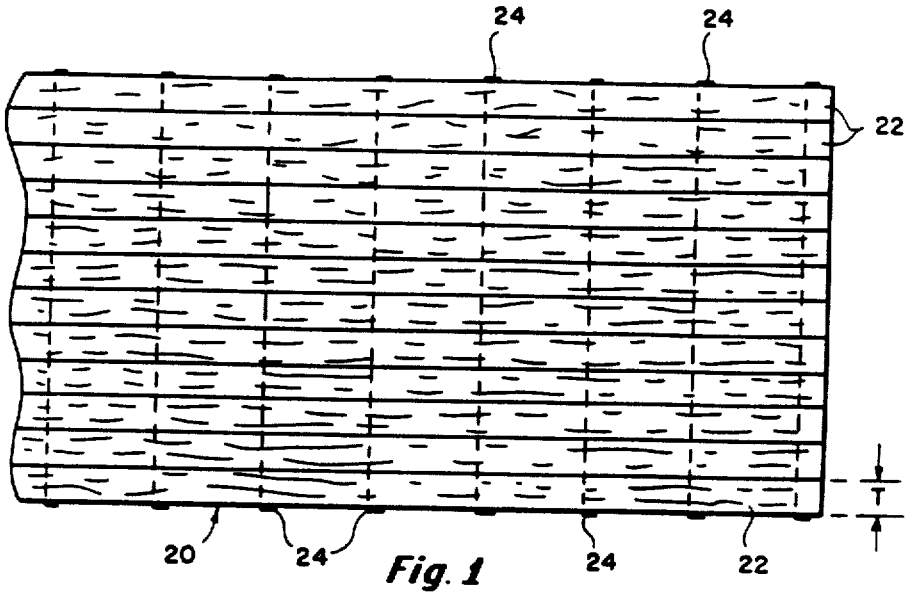
FIG. 1 is a fragmentary plan view of an insulating mat made from strips of a ceramic fiber blanket.

Referring to the drawings in detail, FIG. 1 shows a portion of the outer surface (hot face) of an insulating mat, generally designated by the reference character 20, composed of a plurality of strips 22 which are cut transversely from a ceramic fiber blanket (not shown). As indicated heretofore, these ceramic fiber blankets are generally provided in widths of several feet, of thicknesses generally ranging from one-sixteenth of an inch to three inches and of almost any desired length; the manufacturer generally rolls up the blankets lengthwise so that, when supplied, these blankets are in the form of rolls whose diameters are dependent upon the length of material in the roll. When the strips 22 are cut from the fiber blanket they are cut in a direction of the thickness perpendicular to the width and length so that the lowermost strip 22 shown in FIG. 1 has a dimension T which represents the thickness of the fiber blanket from which the strips 22 are cut.

The strips 22, after they are cut from the fiber blanket, are placed on edge adjacent each other until the desired width of mat is obtained as shown in FIG. 1. Obviously, the number of strips required will depend upon the thickness T of the fiber blanket from which the strips are cut. If a fiber blanket could be provided of thickness twice that of T, then only one half of the number of strips shown in FIG. 1 would be required. Furthermore, if it were possible to provide a fiber blanket having a thickness equal to the width of the resulting block or mat therefor, then only one such strip would be employed in connection with each insulating block.

Figure 2:
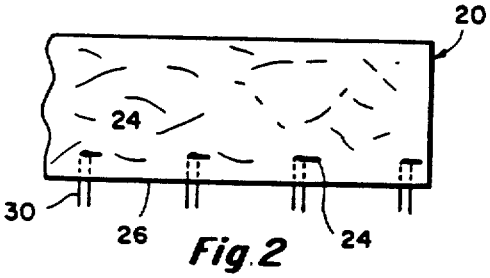
FIG. 2 is a fragmentary side elevation of the ceramic fiber mat shown in FIG. 1.
Figure 3:
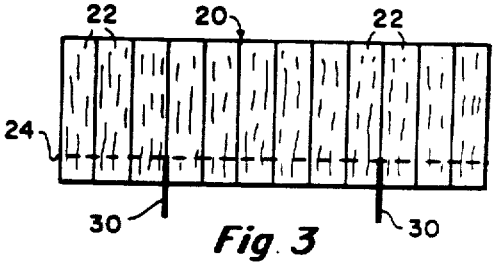
FIG. 3 is an end elevation of the ceramic fiber mat shown in FIG. 1.

The strips 22 are held together by any convenient means; as best shown in FIGS. 1 to 3, the strips 22 are held together by means of a plurality of stainless steel wires 24 which run transverse to the strips approximately one-half inch from and parallel to the cold face 26 of the mat. The ends of the wires 24 are bent at right angles as shown so as to be retained in position. Various methods and means can be used in conjunction with these wires 24 to attach the mat 20 to a sheet or block of backing type insulation 28 (see FIGS. 5 and 6); for example, a plurality of hairpin-type devices 30 can be placed over the wires 24 at various positions along their length so as to project down below the cold face 26 of the mat 20. Actually, these pins 30 will be driven into the block of backing type insulation 28 and, preferably, these hairpin devices 30 will be of the self-clenching type when they are urged against a hard surface as will appear hereinafter.

Although the mat shown in FIGS. 1 and 2 (and the resulting insulation member comprised thereof) is represented as having a width of approximately one foot and a length of possibly several feet, the preferred shape is shown in FIGS. 4 to 7. The resulting insulating member shown in these figures would have a nominal twelve inch by twelve inch face size and a 2300° F. temperature rating. The actual face size will be $12\frac{1}{4}'' \times 12\frac{1}{4}''$, the additional $\frac{1}{4}''$ insuring fullness in the installed insulation while providing a net twelve inch by twelve inch coverage. Intermediate strips 22' and the outer strips 34 (later to be described) are cut to their respective sizes from one inch thick ceramic fiber blanket. The block of insulation 28 is mineral block insulation which, in this case, is cut to a size two inches thick, ten inches wide and twelve inches long. Since the outer strips 34 overlie the longitudinal side edges of the block 28, these strips would be two inches longer (in the vertical direction as they appear in FIG. 7) than the intermediate strips 22'. It might also be mentioned that a hole 36 is drilled in the center of the block 28 so as to receive a stud (later to be described).

Figure 4:
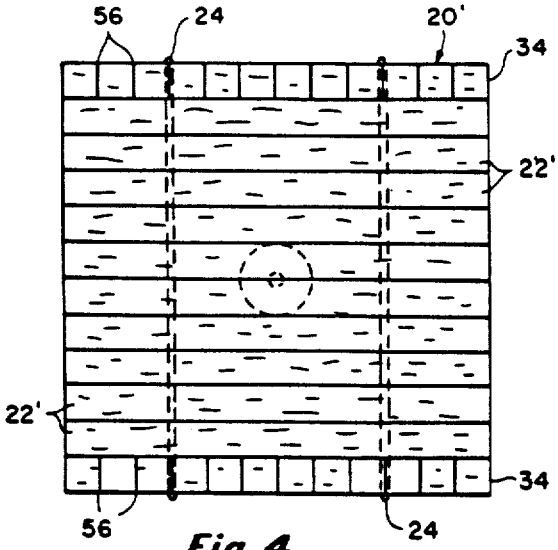
FIG. 4 is a plan view of another embodiment of a ceramic fiber mat made in accordance with the present invention.
Figure 5:
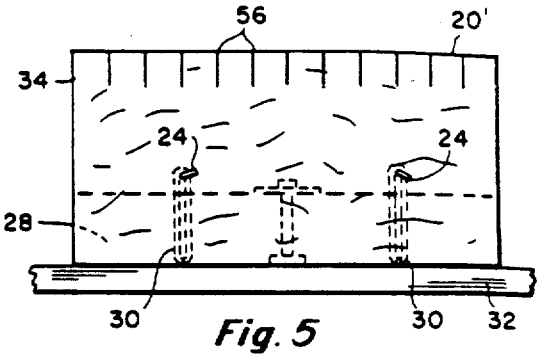
FIG. 5 is a side elevation of the ceramic fiber mat shown in FIG. 4 with certain internal connecting members shown in dotted lines and further showing the association of the resulting insulating member with a furnace wall.

Parts 34 and 22' are not laid side by side to form the hot face and are secured together by means of the stainless steel wires 24 which are bent ninety degrees at the ends to hold them in place. As shown in FIGS. 4 and 5, two such wires 24 are provided for the insulating member shown in these figures, although additional number of wires could be provided if desired.

The next step in the assembly of the insulating member involves the installation of the stud which will now be described. The stud comprises a central shank 38 having nut 40 threadedly mounted at the upper end thereof. A washer 42 is provided on the shank 38 immediately below the nut 40. When installed, the washer 42 will rest against the upper surface of the block 28. The lower end of the shank 38 is provided with a stud tip 44 of relatively smaller cross sectional area. Also mounted on the lower end of the shank 38 are a ring retainer 46 received in the groove 48 and a ring-shaped ceramic arc shield 50 which is secured to the ring 46 by cement or in any other suitable manner. The purposes of the foregoing elements will be described hereinafter in greater detail.

At any event, after the stud (with associated elements attached) is inserted into the hole 36 in the manner described above, the prior assembly of parts 22', 34 and 24 are placed over the block 28 with the lower parts of the side strips 34 overlying the two longitudinal side edges of the block 28. Four hairpin-type stainless steel fasteners 30 (two for each wire 24) are now inserted into the seams between the strips 22' so as to engage the wires 24. These fasteners 30 are driven through and clenched against the back surface of the block 28. By providing a hard surface, preferably steel, below the block 28 when the fasteners 30 are inserted, the lower ends of these fasteners will clench towards each other as shown in FIG. 5. When the tool (not shown) for inserting the fasteners 30 is withdrawn from the seams, the strips 22' will return to their original position without leaving any gap or aperture because of the inherent resiliency of these strips.

Figure 10:
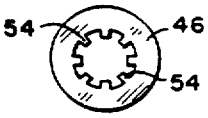
FIG. 10 is an enlargement, on a slightly larger scale, of the retaining ring shown in FIG. 8.
Figure 8:
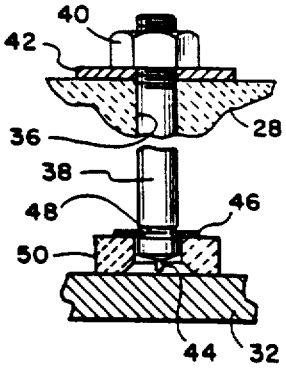
FIG. 8 is an enlarged and fragmentary detail view, with certain parts in cross-section, of the stud, nut and associated structure involved.
Figure 9:
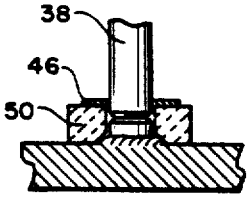
FIG. 9 is a view similar to the lower portion of FIG. 8 showing the relationship of the various parts following the welding operation.

The resulting insulation member, now complete, is ready for installation against a furnace wall 32 by means of a stud welding process which is more fully described and claimed in the patent entitled "Method and Apparatus for Stud Welding" referred to above. The method and apparatus for stud welding (as described in the aforementioned copending application) forms no part of the present invention but is described briefly hereinafter merely to show one manner of attachment of the insulating member 20' to a furnace wall. A stud welding gun 52 is inserted into the central seam between the middle strips 22' until the lower end of the sun engages the nut 40 of the stud. The stud gun is triggered and current flows into the shank 38 and into the tip 44. The tip 44, because of its relatively small cross sectional area burns away and thus starts an arc. The stud shank 38 does not itself move at first because it is supported by the self-locking ring retainer 46 which is retained in the groove 48 as indicated heretofore. As best shown in FIG. 10, the ring retainer 46 is provided with a plurality of radial fingers 54 which project into the recess 48 to hold the ring 46 in position. As the welding operation continues, the intense heat of the arc burns away the fingers 54, thus allowing the stud shank 38 to plunge into the molten metal formed by the arc. At this point, the weld is completed and the gun can be withdrawn. It should be mentioned, however, that the ring retainer 46 and the fingers 54 thereon are carefully sized so that the fingers will burn away, melt, or soften in approximately two tenths of a second, or within whatever period of time is deemed appropriate, all as set forth more fully in the aforementioned copending application.

Now, it may be desirable to tighten the nut 40 on the shank 38. This can be done by merely rotating the gun about the vertical axis of the shank. It might be mentioned that the lower end of the gun (or extension thereof, if desired) is provided with a hexagonal opening corresponding to the size of the nut 40 and of sufficient depth to accommodate for the upper end of the shank 38 after the nut is tightened thereon. Thus the gun 52 serves a secondary function as a wrench for the nut. When the stud gun is withdrawn, the resiliency of the ceramic fiber strips will cause the strips to return to their original position thus concealing and protecting the studs from the severe heat in the furnace.

Returning now to further consideration of FIGS. 4 and 5, it should be noted that the end strips 34 of the insulating member 20' are preferably provided with a plurality of one inch deep cuts 56 spaced approximately one inch apart from each other so as to relieve possible shrinkage stresses on parts 34 only.

Figure 6:
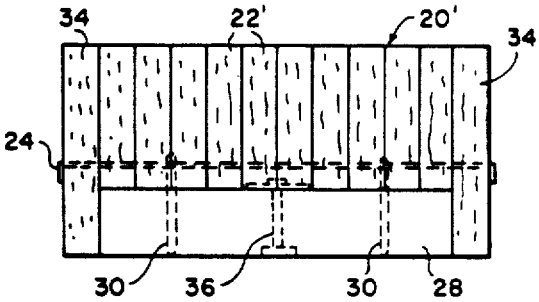
FIG. 6 is an end elevation of the ceramic fiber mat shown in FIG. 5.
Figure 7:
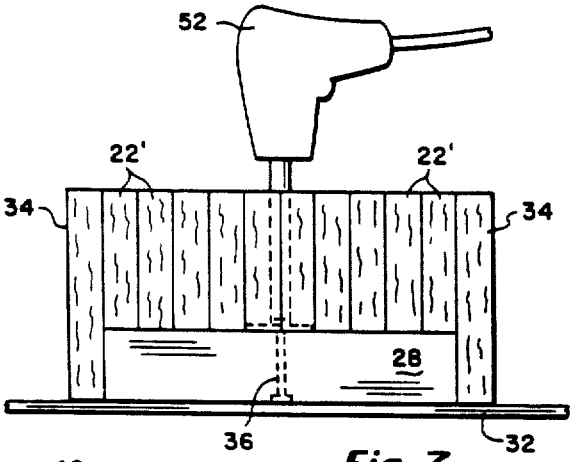
FIG. 7 is a view similar to FIG. 6 showing a method of stud welding of the resulting insulating member to a furnace wall.
Figure 11:
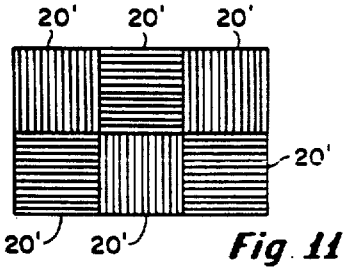
FIG. 11 shows a parquet-type arrangement of insulating members on a furnace wall.

As shown in FIG. 11, it may be desirable to arrange the blocks 20' of FIGS. 4 through 6 in such a manner that the strips of adjacent members are at right angles to each other to give a resulting criss-cross appearance similar to that of parquet flooring. As indicated heretofore, the arrangement of the fibers is such that they are oriented essentially in planes which are perpendicular to the furnace wall. This tends to eliminate or minimize the occurance of cracks which result from heat shrinkage of ceramic fibers. The arrangement shown in FIG. 11 tends to minimize or offset lineal shrinkage of the strips themselves.

Figure 12:
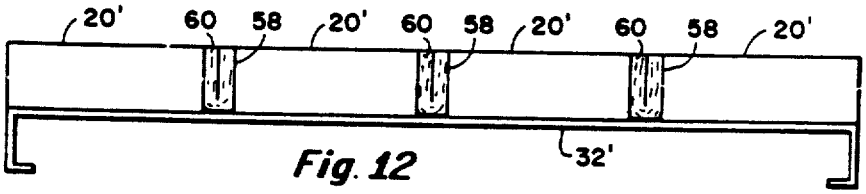
FIG. 12 shows an enlargement of insulating members on a furnace wall with spaces between adjacent members being filled with separate insulating elements.
Figure 13:
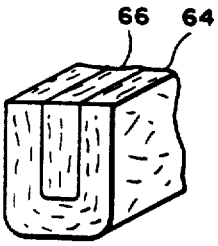
FIG. 13 shows one embodiment of a separate insulating element to be inserted between adjacent insulating members.
Figure 14:
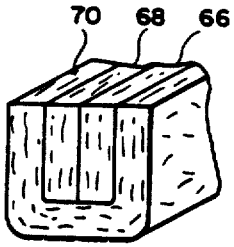
FIG. 14 is another embodiment of a separate insulating element to be inserted between adjacent insulating members.
Figure 15:
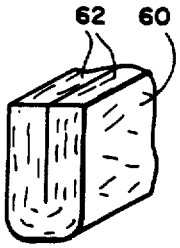
FIG. 15 is still another embodiment of a separate insulating element to be inserted between adjacent insulating members.

The method and apparatus for insulating a furnace wall must be adaptable to walls which do not correspond, dimensionally, to the usage of nominal twelve inch by twelve inch insulating members. Also, it is recognized that the method and apparatus for insulating a furnace should be adaptable to furnaces which have irregularly shaped burner blocks and flue openings. As shown in FIG. 12, it is possible to arrange and attach a plurality of insulating members 20' to the surface 32' of a furnace not readily adaptable for the close end-to-end, side-to-side, arrangement shown in FIG. 11. In the case of FIG. 12, spaces 58 are provided between adjacent insulating members 20' in longitudinal or transverse or both, directions, depending upon the dimensional limitations of the furnace. The resulting spaces 58 can now be filled with specially folded ceramic fiber blankets such as shown in FIGS. 13, 14 and 15. The three fillers shown in the latter three figures are constructed in substantially the same way as the strips 22; that is, they are cut from a one inch thickness of four pound density ceramic fiber blanket and folded over.

In FIG. 15, there would be a single sheet 60 which is folded once so that its upper edges 62 provide the same type of end or edge fiber exposure referred to herein. If the resulting space is larger than two inches wide, then it is possible to go to the configuration shown in FIG. 13 which is comprised of two strips 64 and 66, which are cut in the same manner described above. The central strip 66 is relatively narrow in a vertical direction and the outer strip 64 is sufficiently wide that it can be folded around the central strip 66 as shown, the upper surfaces of strips 64 and 66 both providing the end or edge fiber arrangement referred to above.

Again, if the resulting space between adjacent insulating members 20 are between an insulating member 20 and a duct, etc. is greater than three inches, then it might be desirable to use the configuration shown in FIG. 14 where an additional central strip 68 is provided. This strip 68 will lie adjacent the strip 66 and an outer strip 70, slightly greater in width than the strip 64 will be folded over the central strips 66 and 68 to provide the arrangement shown.

The different embodiments shown in FIGS. 13, 14 and 15 can be held in place by ceramic cement, stainless steel wire or by the friction between the fibers alone.

FURTHER EMBODIMENTS AND MODIFICATIONS

Whereas the method of assembling the mat as described in relation to FIGS. 1 to 3 has been set forth in terms of wires 24, fasteners 30, etc. it should be understood that other methods could be employed to hold the strips together and to attach them to the backing insulation block. For example, the ceramic fiber strips could be attached to each other by means of suitable ceramic cements or mortar materials which are preferably utilized in the area adjacent the cold face of the fiber mat. Also, although the mats have been shown as being connected to a backing insulation block prior to application to a furnace wall, the mats could be applied directly to the furnace wall.

As far as the manner of fastening is concerned, the foregoing disclosure indicates that the mat of FIG. 1 or the composite block of FIG. 4 can be attached to a furnace wall by means of mortar, ceramic cement or various metallic fasteners. Since the ceramic cement or mortar will generally be located adjacent the cold face of the insulating member, there should be no particular high temperature problem as far as the cement or mortar is concerned; however, where metallic fasteners are concerned, it is generally recognized that alloy pins, bolts, washers and screws which could be used as fasteners have a maximum temperature limit in the range of 2000° to 2100° F. By "burying" or imbedding the fastener in the insulating member at a position spaced from the hot face thereof, as disclosed in the present invention, it is possible to use alloy pins, bolts, etc. without, at the same time, exposing these metallic fasteners to such high temperatures as would interfere with their effectiveness.

Although it is indicated that the mat of FIG. 1 could be applied directly to a furnace wall by means of ceramic cement or mortar, it is possible to precondition the cold face of the mat to permit the use of the stud welding method of attachment disclosed herein. For example, if a layer of cement or mortar is embedded in the mat along the cold face thereof and allowed to harden, it is obvious that the welding technique and fasteners described in connection with FIGS. 7 to 10 could be employed, although a shorter shank 38 obviously would be necessary. The making of such a cement or mortar layer at the cold face of the mat could also be done in connection with the use of a high temperature cloth or stainless steel wire mesh which would be applied to or imbedded in the mortar layer at the cold face of the mat to improve the fastening capabilities thereof.

Referring now to FIGS. 4 through 7, a suitable insulating block 20' designed for operation at 1800° F. is one where the backing block or mineral block 28 is about two inches in thickness and the strips 22' are approximately one inch in width giving a total width of the block, from the cold face to the hot face thereof, of about three inches. A suitable insulating block 20' designed for operation at 2600° F. is one where the mineral block 28 is also two inches in thickness but where the strips 22' are four inches in thickness giving an overall dimension of six inches from the cold face to the hot face. By using strips 22 varying in width from one inch to five inches or more, depending upon the requirements of the particular furnace, it should be apparent that insulating blocks and/or mats could be employed to cover the recommended range of 1600° F. to 2800° F.

Although the block 28 has been referred to as a mineral block whose composition and properties are well recognized in the art, it is also possible to use asbestos block or calcium silicate block, these blocks being relatively rigid, especially as compared to the fiber mat or strips, so as to provide relatively rigid backing material for the mat. The strips 22 or 22' of the ceramic fiber mat 20 or 20', respectively, are preferably cut from a ceramic fiber blanket having a density of four pounds per cubic foot. It is understood that the manufacturers provide ceramic fiber blankets which are available in densities ranging generally from three to fourteen pounds per cubic foot. In the specific examples referred to herein, the ceramic fiber material has a density of four pounds per cubic foot. However, it should be understood that there might be portions of the furnace where the lining would be subject to gas currents which would give rise to erosion problems and, also, that the furnace might have various access openings which would require a lining of greater physical strength or density upon or surrounding the openings; in either of the latter two cases it might be desirable to use a ceramic fiber material of a higher density in the available range referred to above.

Naturally, it is desirable to insulate a furnace wall in such a manner that the outside (cold face) of the furnace is at a minimum temperature. However, it is recognized that this minimum temperature will be dependent upon a number of different factors including, but not limited to, the type, thickness and strength of the outside furnace wall; and prevailing air currents outside of the furnace wall. The use of the present invention will provide an outside temperature varying between 200° F. and 350° F. which is considered to be an acceptable range.

The preferred embodiment of the present invention, as disclosed above, describes the high-temperature insulating fibers which constitute the mat as "ceramic" fibers. However, this invention should not be tied down to any precise definition of "ceramic"; any high temperature insulating fiber which possesses properties similar to the ceramic fibers indicated herein and capable of operating above 1600° F. could be used in conjunction with the present invention and should be considered as falling within the scope thereof.

Whereas the present invention has been described in particular relation to the drawings attached hereto, it should be understood that other and further modifications apart from those shown or suggested herein may be made within the spirit and scope of this invention.

What is claimed is:

1. [An] *A high temperature* insulation module *of refractory material* for lining the interior walls of a furnace, comprising a rigid block of refractory material [having two opposed flat sides,] *the module having two opposite flat faces,* one [side] *face* being the cold face for attachment to the furnace wall and the other [side] *face* being the hot face for exposure to the furnace heat, *a plurality of sides extending between the cold and hot faces,* a resilient fiber insulation mat forming at least the hot face and being held flat within the rigid block prior to installation on the furnace wall, the fibers in the insulation mat being generally randomly oriented in planes, such planes being substantially perpendicular to the hot face, *and the cold face including a supporting sheet member bonded to the mat for supporting the mat, the supporting member having a fastener zone which is spaced from the hot face and is spaced inwardly of the sides of the module, said fastener zone being adapted to receive a fastener, the mat being bonded to the supporting member, the fastener zone being accessible from the hot face by resilient displacement of the fibers, and the fibers being arranged to conceal the fastener when positioned at the fastener zone, the fastener zone defining an aperture zone for the passage of an inner end of the fastener through the supporting member for attachment of the inner end to a furnace wall to attach the supporting member to a furnace wall, the supporting member being rigid relatively to the mat to support the module against a furnace wall when the supporting member is attached to the furnace wall at the fastener zone.*

2. An insulation module according to claim 1, *wherein said supporting member* further [comprising] a hard surface self-contained within the [rigid block] *module* prior to installation *of the module* on [the] *a* furnace wall, *the hard surface* [and] being hidden beneath the hot face and *defining a surface directed toward the hot face* against which *an outer end of* a fastener can bear to secure the insulation module to the furnace wall.

3. An insulation module according to claim 1 further comprising an internal fastener self-contained within the [rigid block] *module* prior to installation on the furnace wall and being hidden beneath the hot face *between the supporting member and the hot face, the fastener being capable of extending through the fastener zone for attachment to a furnace wall to secure the fastener zone between it and such a furnace wall,* whereby the [cold face of the insulation module] *supporting member* may be fastened to the furnace wall without direct exposure of the fastener to the heat at the hot face.

4. An insulation module according to claim 1 [further] *said supporting member* comprising a rigid base forming the cold face [of the rigid block], the fiber insulation mat being affixed to the rigid base.

5. An insulation module according to claim 4 wherein the fiber insulation mat is secured to the [rigid base] *supporting member* with [an] *a ceramic cement* adhesive bond, *and wherein the supporting member is in the form of a backing sheet member.*

6. An insulation module according to claim 1 wherein the fiber insulation mat includes a number of strips of fiber insulation cut from a fiber blanket and arranged in side-by-side relation.

7. An insulation module according to claim 6 further including strips of fiber insulation attached to the side edges of the [rigid block] *module.*

8. An insulation module according to claim 6 wherein the strips of fiber insulation are connected to each other by a number of wires extending transversely through the strips.

9. An insulation module for lining the walls of a high temperature furnace, *said module* comprising a rigid block of refractory material pre-assembled prior to installation on the furnace wall, [the block] *said module* having two opposed flat sides, one side being the cold face for attachment to the furnace wall and the other side being the hot face for exposure to furnace heat, *a supporting means comprising* a rigid base member forming the cold face [within the] *of the module thereby defining said* rigid block, a resilient fiber insulation mat being affixed flat to the base member and forming the hot face, the fibers in the insulation mat being generally randomly oriented in planes, such planes being substantially perpendicular to the hot face, *said mat further defining sides of the module extending between the hot and cold faces, the sides extending beyond the outer periphery of the base member to abut sides of corresponding modules when attached to furnace walls in side-by-side relationship to line such walls, said supporting means being accessible from the hot face by a displacement of resilient fibers at the hot face to thereby facilitate an attachment of the supporting member to an interior wall of a furnace by an attaching operation performed through the hot face and a springing back of the resilient fibers to generally their position prior to such displacement.*

10. An insulation module according to claim 9 wherein the base member comprises a substantially rectangular mineral block.

11. An insulation module according to claim 9 further comprising an internal metallic fastener self-contained within [the rigid block] *said module* prior to installation on the furnace wall, *the fastener being located on a face of the base member directed towards the hot face* and *being* hidden beneath the hot face, whereby *the supporting means of* the cold face of the insulation module may be fastened to the furnace wall without direct exposure of the fastener to the high temperature heat at the hot face.

12. An insulation module according to claim 9 wherein the fiber insulation mat includes a number of strips of fiber insulation cut from a fiber blanket and arranged in side by side relation.

13. An insulation module according to claim 12 including strips of fiber insulation attached to the side edges of [the rigid block] *said module.*

14. An insulation module according to claim 12 wherein the strips of fiber insulation are connected to each other by a number of wires extended transversely through the strips.

15. An insulation module according to claim 14 further including staples surrounding the wires extending through the strips of fiber insulation and extending into the base member for attaching the fiber insulation mat thereto.

16. An insulation module according to claim 9 including a washer centrally located against the face of the base member at the interface between the base member and the fiber insulation mat, the washer being provided with a central hole, the base member being provided with a hole in alignment with the hole in the washer and extending through the base member to the [hot] *cold* face, a bolt extended through the holes in the washer and the base member *for use in attaching the module to a furnace wall,* and a threaded nut threadedly engaging the end of the bolt lying adjacent the washer, *said resilient fibers covering said bolt and washer when said module is attached to the furnace wall.*

17. An insulation module *of refractory material* for lining the walls of a high temperature furnace *in association with corresponding modules in a parquet arrangement,* comprising a rigid block of refractory material, *said module* being preassmbled prior to installation on the furnace wall, the [block] *module* having two opposed major faces, one major face being the cold face for attachment to the furnace wall and the other major face being the hot face for exposure to a furnace heat, *a supporting means comprising* a rigid base member forming the cold face [within the] *thereby defining said* rigid block, a plurality of strips of resilient fiber insulation being arranged in side by side relation and being affixed upon the base member on the side opposite the cold face to form the hot face of the rigid block, the strips being cut from a fiber blanket and being arranged in such a manner that the fibers in such strips are generally randomly oriented in planes, the planes being substantially perpendicular to the cold face, *said supporting means being accessible from the hot face by a displacement of resilient fibers at the hot face for attachment of the rigid base to a furnace wall by means of a fastener extending through the base.*

18. An insulation module according to claim 17 further comprising additional strips of such fiber insulation affixed around the side edges of the base member adjacent the hot face and being flush with the hot face.

19. An insulation module for lining the walls of a high temperature furnace and being preassembled prior to installation, comprising:

a relatively rigid block of refractory material having a flat side for attachment to the furnace wall as the cold face, said block having substantially centrally located opening extending at right angles to the cold face;

a washer disposed on the surface of said block remote from said hot face and having a hole therein aligned with the opening in said block;

a metallic stud extending through said hole in said washer and through said opening in said block *for attachment to a wall of a furnace to attach the module to such a wall;* a threaded nut threadedly engaging the other end of said stud and overlying said washer;

a plurality of strips of ceramic fiber blanket disposed in parallel side-by-side arrangement over the surface of said block remote from said cold face and forming a ceramic fiber mat completely covering the face of said block, the fibers in said mat being generally randomly oriented in planes, the planes being generally perpendicular to the cold face of said block, said mat also including strips of ceramic fiber at the side edges thereof extending downwardly to said cold face to cover the edges of said block *said threaded nut being accessible from the hot face by a displacement of resilient fibers at the hot face.*

20. An insulation-module for lining the walls of a high temperature furnace and being pre-assembled prior to installation, comprising:

a substantially rectangular mineral block having a cold face for attachment to the furnace wall, said mineral block having a substantially centrally located opening extending through the thickness of said block;

a washer disposed on the surface of said mineral block opposite the cold face and having a hole therein aligned with the opening in said mineral block;

a metallic stud having a shank portion extending through said hole in said washer and through said opening to the cold face of said mineral block, the end of said stud adjacent said opposite surface of said mineral block terminating in a stud tip of relatively smaller cross-sectional area than said shank portion, said shank portion leaving a groove therein adjacent said stud tip, a ring retainer surrounding said shank portion and having radially inwardly projecting fingers received in said groove, a ring-shaped arc shield surrounding said stud tip and being attached to said ring retainer, a threaded nut threadedly engaging the other end of said stud and overlying said washer;

a plurality of strips of ceramic fiber blanket disposed in parallel side-by-side arrangement over the surface of said mineral block remote from said cold face and forming a ceramic fiber mat completely covering said mineral block, the fibers in said mat generally being randomly oriented in planes, the planes being substantially perpendicular to the cold face of said block, said mat also including strips of ceramic fiber at the side edges thereof extending downwardly towards said opposite surface of said mineral block to cover the edges of said mineral block;

a plurality of wire fasteners extending transversely through said fiber strips and being bent at the opposite ends thereof to hold said strips together, said wire fasteners being substantially parallel to each other and to said one surface and being located in said fiber mat adjacent the interface between said mat and said mineral block; and a plurality of hairpin-type fastening means surrounding each wire fastener and extending into said mineral block to secure said mat to said mineral block.

*21. A high temperature insulation module of refractory material for lining the interior walls of a high temperature furnace without the requirement of a preliminary attachment of an insulation support hardware to the interior walls, said module comprising two opposed flat faces, a first of said flat faces being a cold face for attachment to the furnace wall and a second of said faces being a hot face for exposure to high temperature of the furnace, a relatively resilient fiber insulation mat forming at least the hot face, the fibers in the insulation mat being generally randomly oriented in planes, such planes being substantially perpendicular to the hot face, a relatively rigid supporting member for supporting the fiber insulation mat, said supporting member comprising at least a portion of said cold face, a plurality of sides contiguous with said hot face and said cold face and defining the outside boundary of said module, an attachment mechanism receiving zone defined by said supporting member and a portion of said resilient fiber insulation mat spaced apart from said hot face and from said plurality of sides, said zone being accessible from the hot face by a displacement of relatively resilient fibers at the hot face to thereby facilitate the introducing of an attachment mechanism from said hot face into said zone to attach the supporting member to an interior wall of a furnace at any desired location, said resilient fibers being generally operable to return to their position prior to such displacement to thereby protect an attachment mechanism from the high temperature of the furnace.*

*22. A high temperature insulation module of refractory material for attachment to a furnace wall surface of an interior wall of a high temperature furnace, the module comprising a resilient fiber insulation mat defining a cold face to be directed towards and an opposed hot face to be directed away from such a furnace wall surface during use, and the mat defining a plurality of sides extending between the hot and cold faces, the fibers in the insulation mat being generally randomly oriented in planes, such planes being substantially perpendicular to the hot face, a backing sheet member fixed to the cold face for supporting the mat, the backing sheet member having a single attachment zone which is spaced from the sides of the mat, which is accessible through the hot face by resilient displacement of the resilient fibers, which is penetrable by a portion of a fastener inserted through the mat from the hot face to attach the backing sheet member to such a wall surface by attaching the attachment zone of the backing sheet member to such a wall surface by means of such a fastener, and which defines a fastener zone proximate the attachment zone between the attachment zone and the hot face and spaced from the hot face for accommodating a second portion of a fastener to distribute attachment pressure over the attachment zone to support the module against such a wall surface.*

*23. An insulation module according to claim 22, in which the backing sheet member is bonded to the surface of the cold face by means of an adhesive cement.*

*24. An insulation module according to claim 23, in which the backing sheet member is a rigid metal mesh.*

*25. An insulation module according to claim 22, in which the attachment zone is penetrable by a portion of a fastener by having a hole through which a fastener can penetrate.*

*26. An insulation module according to claim 22, in which the single attachment zone is centrally positioned relatively to the sides of the module.*

*27. An insulation module according to claim 24, in which the module has a washer located in the fastener zone to extend over the attachment zone.*

* * * * *

UNITED STATES PATENT AND TRADEMARK OFFICE

CERTIFICATE OF CORRECTION

PATENT NO. : Re 33,463

DATED : November 27, 1990

INVENTOR(S) : Robert A. Sauder et al.

It is certified that error appears in the above—identified patent and that said Letters Patent is hereby corrected as shown below:

Column 1, line 52, "propossed" should be -- proposed --.

Column 5, line 44, "not" should be -- now --.

Column 6, line 27, "sun" should be -- gun --.

Column 10, line 2, after "[comprising]", insert -- *comprises* --.

Column 11, line 49, before "furnace" delete -- a --.

Signed and Sealed this

Twelfth Day of May, 1992

*Attest:*

DOUGLAS B. COMER

*Attesting Officer*

*Acting Commissioner of Patents and Trademarks*